Patented Feb. 5, 1952

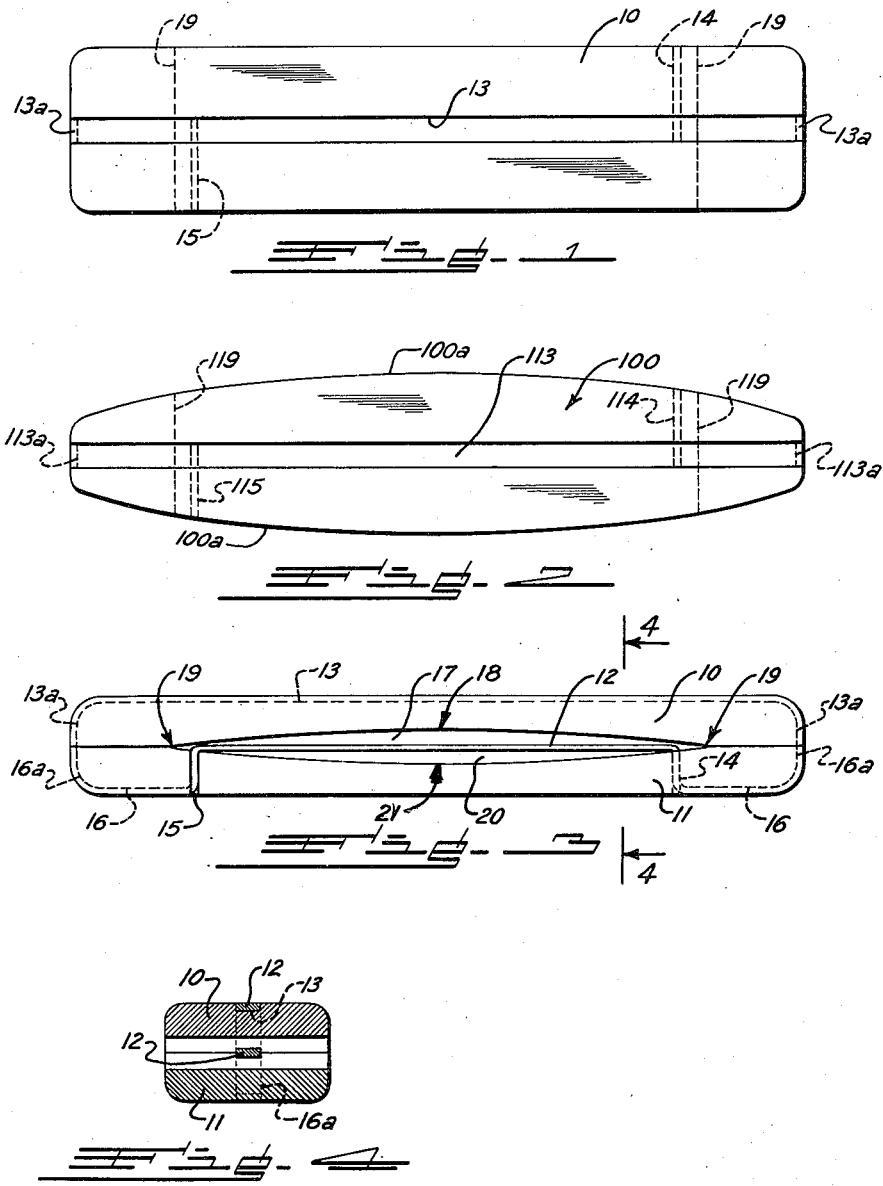

2,584,549

UNITED STATES PATENT OFFICE 2,584,549

DEER CALL

Arthur H. Carhart, Denver, Colo.

Application March 31, 1947, Serial No. 738,252

4 Claims. (Cl. 46—180)

1

The present invention relates to a deer call. It has to do, particularly although not exclusively, with a simple, light-weight, and inexpensive device or instrument adapted particularly for use by game hunters for attracting the attention of, or calling game, such, for example, as deer. It is to be understood that the invention is not limited to use in calling or attracting the attention of deer, but it may be used for luring other game by simply varying the width of the elastic band forming a part of the calling device and changing the tension of said band, whereby to convert it into a call for fowl or birds, such as hawks, and for animals, such as coyotes and the like. It is interesting to note that a coyote or hawk, when hearing a rabbit in its death call, will travel usually at a high rate of speed directly to the animal, rather than to sneak up on it. Thus, by creating an artificial rabbit death call, the bird or other game will approach the spot from which the call emanated, out in the open and thus provide a good target and permit a fair shot by the hunter.

It is, therefore, one of the important objects of the present invention to provide an improved and simplified, as well as inexpensive device, or instrument, of the foregoing character which is of relatively small size and which may be carried in a pocket and operated easily by a hunter.

Another object of the present invention is to provide an improved game-calling device which includes, as a part thereof, an elastic band, the band being removable for the substitution of another band of a different width to adapt the the device for use in calling different kinds of game.

A further object of the present invention is to provide an improved game-luring device capable of imitating animal calls, in which the device is formed from two generally like halves or sections of plastic, such as transparent or translucent plastic, or other material, which are so formed and shaped as to be releasably held together in cooperative relationship by an elastic band, the band and the conformation of the halves or sections together serving to create the necessary sound or animal call when the device is placed between the lips of a hunter, or other user, and blown.

The foregoing and other objects and advantages of the present invention will appear from the following description and appended claims, when considered in connection with the accompanying drawing, wherein like reference characters designate corresponding parts in the several views.

2

In said drawing:

Fig. 1 is a top plan view of a game calling device embodying the present invention.

Fig. 2 is a top plan view of a game call of somewhat modified form, embodying the present invention.

Fig. 3 is a side elevational, or edge view of the device of Fig. 1; and

Fig. 4 is a transverse vertical sectional view taken substantially along the line 4—4 of Fig. 3, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to Figs. 1, 3 and 4 of the drawings, there is shown in these figures one form of game call, such as a deer call, embodying the present invention. As shown, the instrument comprises a mouthpiece preferably formed of two generally similar halves or sections 10 and 11 which are formed preferably from transparent or translucent plastic which, as shown, are adapted to be held together in cooperative and operative relationship by suitable means, such as an elastic band 12. The rubber band 12 serves to hold the halves or sections 10 and 11 releasably together, thus permitting them to be separated and a band of a different width installed. The band may have somewhat different tension also from the band 12 herein illustrated.

The upper section 10, as arranged in Figs. 1, 3 and 4 of the drawing, is preferably of oblong shape and has formed in its outer surface a longitudinal groove 13 which is continued over the end edges of the member 10 to provide end groove portions or extensions 13a.

The under or lower section or half 11 is provided, as shown, with transversely extending slots or kerfs 14 and 15, which slots extend from each of the longitudinal side edges of the member 10 toward the opposite longitudinal side edge thereof, being extended inwardly and intersecting or defining the inner ends of relatively short longitudinally extending external grooves 16 which are continued or extended at 16a around the end edges of the lower half or section 11. Thus, the cross slots 14 and 15 communicate with the grooves 16 and 16a, which latter communicate with the grooves 13a and 13 of the upper half or section 10 when the two halves are brought together in cooperative and operative relationship, as best seen in Figs. 3 and 4.

The section 10 is hollowed out internally and tapered longitudinally to provide a recess or concavity 17 in its inner or under face, said groove having its greatest depth at a central point 18 and diminishing in depth toward its opposite ends as indicated at 19, see particularly Figs. 1 and 3. The recess or hollowed out portion 17, while tapering from its central point 18 in gradually diminishing fashion toward its outer extremities 19, is constant transversely or crosswise of the member 10.

The other or, as shown, lower half or section 11 is also hollowed out to provide a recess or concavity 20 which has its greatest depth at a point indicated at 21 and is reduced gradually in its outward taper in opposite directions to points corresponding to the points or outer extremities 19 of the other half or section 10. As seen in Fig. 3, the tapered recesses or concavities 17 and 20 are substantially identical, the recess 20 being interrupted only by the slots or cuts 14 and 15 formed in member 11.

The two concavities 17 and 20 together provide a longitudinally disposed double-tapered space or opening through the calling device or instrument. A portion or section of the elastic member or rubber band 12 is disposed in this space and extends (see Fig. 3) from approximately the point 19 adjacent one end to a similar point 19 adjacent the opposite end, this portion of the band 12 being held under tension. By positioning the call with the combined concavities 17 and 20 in registry with the human lips and blowing outwardly through the space formed by concavities 17 and 20, the tensioned section or portion of the elastic band 12 within said space will be caused to vibrate and thus imitate the call of a given animal, fowl, or bird. As shown, the recesses 17 and 20 extend lengthwise beyond the cuts or kerfs 14 and 15 a slight distance. If desired, these concavities may be longer than illustrated; or they may terminate, if desired, at the slots 14 and 15.

It has been found that elastic bands, such as the rubber band 12 shown in Figs. 3 and 4, of different or variable widths will produce different sounds when vibrated by pressure of the human breath blown upon them while held under tension between the sections or halves 10 and 11. Thus, by varying or changing the bands, the calls of different kinds of game may be imitated.

In Fig. 2 of the drawings there is shown a somewhat modified calling device or instrument embodying the present invention. In this figure, the two halves or sections (only the upper or top section 100 being shown in this figure) are provided with convex longitudinal edges, such as the edges 100a. The sections are otherwise the same as in the preceding form of the invention, the top section having a band-receiving groove or channel 113 which extends longitudinally thereof and downwardly over the ends, as seen at 113a. The under section (not shown) is provided with oppositely disposed transverse slots or saw kerfs 114 and 115. The purpose of the grooves or channels and the slots is to support under tension an elastic band (not shown) which is similar to the band 12 of Figs. 3 and 4. The inner cooperating and abutting faces of the upper member 100 and the lower member or half (not shown) are hollowed out to provide an oppositely outwardly extending tapered central recess having portions in each half and corresponding to those indicated at 17 and 20, Fig. 3. The ends of the cooperating recesses are indicated by the broken transverse lines 119. It will be understood that the cooperating concavities of this form may extend to or beyond the transverse slots or kerfs 114 and 115.

While in the form of Figs. 1, 3 and 4, the lower or under half or section 11 is provided with relatively short longitudinal grooves 16, it will be understood that, if desired, these grooves need not be interrupted, as shown, but may be in the form of a single continuous groove (not shown) which extends throughout the length of member 11. The same may apply to the under half or section (not shown) of the modified form of Fig. 2. In other words, in both forms of the invention, or in either of them, both upper and lower halves or portions of the calling device may have longitudinal grooves which extend throughout their length.

It is to be understood that when it becomes desirable to change the tonal quality of the calling device, the elastic member or band, such as band 12, may be pulled or stretched at a point or points beyond the kerfs 14, 15 or 114, 115 so as to increase or vary the tension of that portion of the band which extends between the pairs of kerfs.

The material from which the calling device of the present invention is formed may vary. For example, wood, metal, such as aluminum or the like, plastics of various kinds, and other suitable materials may be employed.

Having thus described the invention, what is claimed is:

1. A game call comprising contiguous elongated upper and lower sections, said upper and lower sections having longitudinally concave recesses located centrally on their contiguous surfaces, said recesses forming an opening of uniform transverse section converging adjacent both ends of said sections, a continuous elastic band tensioned longitudinally through said opening, said band extending outwardly through one of said sections adjacent the two points of convergence, and said elastic band also extending around both ends of said sections and longitudinally over the outer surface of the other one of said sections whereby said continuous elastic band holds said sections to each other in operative relation and provides a vibratory means for propagation of sound in said opening.

2. A game call as set out in claim 1 wherein aligned longitudinal grooves are provided in the outer surfaces of said sections and slots are provided in the lateral edges of said one section adjacent said points of convergence for guiding and retaining said elastic band.

3. A deer call device of the character described comprising opposed relatively flat elongated members having an elongated recess between the same, spaced openings in said members and an elastic member disposed longitudinally within said recess and extending through said openings and around portions of said members and maintaining them together.

4. A deer call device of the character described including opposed relatively flat elongated members secured together and having cooperating portions providing an elongated recess between them when assembled, the opposed surfaces of the recess tapering in opposite directions from substantially the midpoint thereof toward the outer ends, a transverse opening in one of said members and a second transverse opening in one of said members in spaced relation to said first transverse opening and communicating with said recess and an elastic band-like member disposed longitudinally within said recess and extending into said spaced transverse openings to maintain said member under tension.

ARTHUR H. CARHART.

REFERENCES CITED

The following references are of record in the file of this patent:

UNITED STATES PATENTS

| Number | Name | Date |
|---|---|---|
| 1,542,147 | Kragiel | June 16, 1925 |
| 2,182,692 | Harbin | Dec. 5, 1939 |

FOREIGN PATENTS

| Number | Country | Date |
|---|---|---|
| 32,605 | Germany | Jan. 10, 1885 |
| 83,135 | Switzerland | Nov. 17, 1919 |